US010735206B2

(12) United States Patent
Shin et al.

(10) Patent No.: US 10,735,206 B2
(45) Date of Patent: Aug. 4, 2020

(54) SECURING INFORMATION EXCHANGED BETWEEN INTERNAL AND EXTERNAL ENTITIES OF CONNECTED VEHICLES

(71) Applicant: THE REGENTS OF THE UNIVERSITY OF MICHIGAN, Ann Arbor, MI (US)

(72) Inventors: Kang G. Shin, Ann Arbor, MI (US); Kyusuk Han, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 255 days.

(21) Appl. No.: 15/805,806

(22) Filed: Nov. 7, 2017

(65) Prior Publication Data

US 2018/0131524 A1    May 10, 2018

Related U.S. Application Data

(60) Provisional application No. 62/418,315, filed on Nov. 7, 2016.

(51) Int. Cl.
  *H04L 9/32* (2006.01)
  *H04L 9/06* (2006.01)
  (Continued)

(52) U.S. Cl.
  CPC .......... *H04L 9/3263* (2013.01); *H04L 9/0643* (2013.01); *H04L 9/14* (2013.01);
  (Continued)

(58) Field of Classification Search
  None
  See application file for complete search history.

(56) References Cited

U.S. PATENT DOCUMENTS 9,985,907 B2 * 5/2018 Yousefi ................... H04L 12/46
2008/0148374 A1   6/2008 Spaur et al.
(Continued)

FOREIGN PATENT DOCUMENTS

KR           101481403 B1 *  1/2015
WO    WO-2013123057 A1      8/2013

OTHER PUBLICATIONS

Pierre Kleberger et al "Protecting Vehicles Against Unauthorized Diagnostics Sessions Using Trusted Third Parties" 32nd International Conference, SAFECOMP 2013, Toulouse, France (2013).
(Continued)

*Primary Examiner* — Farid Homayounmehr
*Assistant Examiner* — Olanrewaju J. Bucknor
(74) *Attorney, Agent, or Firm* — Harness, Dickey & Pierce, P.L.C.

(57) ABSTRACT

Data in vehicle networks has been treated as proprietary assets, due to car makers' concern of potential IP infringement via extraction of confidential vehicular data. To address this concern, an intermediate gateway in between internal and external networks translates proprietary in-vehicle data to rich type data, thus preventing the exposure of raw in-vehicle data. The translation relies solely on the gateway which can be a direct target of cyberattacks, making it difficult to trust the data through the gateway. This, in turn, requires authentication of the translated data. A communication protocol is presented that provides secure communications between the vehicle's internal components and external entities. The protocol enables authorization of external servers for in-vehicle ECUs as well as authentication and proof of messages between internal and external components to combat a compromised gateway.

13 Claims, 11 Drawing Sheets

(51) Int. Cl.
*H04L 9/14* (2006.01)
*H04W 88/16* (2009.01)
*H04W 84/00* (2009.01)

(52) U.S. Cl.
CPC ........ *H04L 9/3242* (2013.01); *H04L 2209/76* (2013.01); *H04L 2209/84* (2013.01); *H04W 84/005* (2013.01); *H04W 88/16* (2013.01)

(56) References Cited

U.S. PATENT DOCUMENTS

| | | | |
|---|---|---|---|
| 2010/0250053 A1* | 9/2010 | Grill | H04L 12/40 701/31.4 |
| 2011/0055292 A1* | 3/2011 | Madau | H04L 12/4625 707/809 |
| 2011/0138188 A1 | 6/2011 | Lee et al. | |
| 2013/0198802 A1* | 8/2013 | Ricci | H04L 63/10 726/1 |
| 2015/0089236 A1* | 3/2015 | Han | H04L 9/3242 713/181 |
| 2015/0150124 A1 | 5/2015 | Zhang et al. | |
| 2016/0050265 A1* | 2/2016 | Botticelli | H04L 67/125 709/219 |
| 2016/0173505 A1* | 6/2016 | Ichihara | H04L 63/123 713/170 |
| 2016/0330292 A1* | 11/2016 | Helpingstine | H04L 67/327 |
| 2017/0013005 A1* | 1/2017 | Galula | H04L 63/1425 |
| 2017/0244594 A1* | 8/2017 | Shiota | G07C 5/0808 |
| 2018/0084412 A1* | 3/2018 | Alfred | H04L 9/088 |

OTHER PUBLICATIONS

Philipp Mundhenk, et al "Lightweight Authentication For Secure Automotive Networks" 2015 Design, Automation & Test in Europe Conference & Exhibition (2015).

* cited by examiner

| 1 | 12 or 32 | 6 | up to 64 bits | 16 | 2 | 7 |
|---|---|---|---|---|---|---|
| SOF | Arbitration | Control | Data Field | CRC | ACK | EOF |

SECURING INFORMATION EXCHANGED BETWEEN INTERNAL AND EXTERNAL ENTITIES OF CONNECTED VEHICLES

CROSS-REFERENCE TO RELATED APPLICATIONS

This application claims the benefit of U.S. Provisional Application No. 62/418,315, filed on Nov. 7, 2016. The entire disclosure of the above application is incorporated herein by reference.

FIELD

The present disclosure relates to securing information exchanged between internal and external entities of connected vehicles.

BACKGROUND

Recent advances of in-vehicle technology have paved a way to connect vehicles to the external world. Car makers are adding various connectivity and telematics solutions for passenger and fleet vehicles. They have also introduced solutions that either use an embedded modem or connect to the Internet via the driver/passenger's cellphone (e.g., GM OnStar, Ford Sync). Besides, fleet solution providers offer solutions attachable to the vehicle's on-board diagnostics (OBD2) port (e.g., Delphi Connect and Zubie). As a result, in-vehicle networks are being connected to an external communication channel for remote diagnostics and remote triggering of on-board functions.

Externally connected devices collect in-vehicle data from, and inject messages into in-vehicle networks. A controller area network (CAN) bus—the de facto in-vehicle network—is connected to an outside network via external interfaces, such as 3G/4G, WiFi and Bluetooth. The device between internal and external networks is called an external interface ECU, or simply a gateway.

Car manufacturers do not want to expose their intellectual assets via vehicle connectivity since their in-vehicle message semantics are usually proprietary. Thus, the gateway translates in-vehicle data to rich type data (e.g., JSON, XML), concealing their proprietary data inside the vehicle.

However the gateway may be compromised and then become a potential threat to vehicle safety and security. That is, since the transmission from and to an external entity relies entirely on the gateway, the communicated data becomes untrustworthy once the gateway is compromised. For example, the compromised gateway can make incorrect translation of, or drop/delay messages, and hence it is referred to as "bogus interpreter problem."

Existing communication models only consider the communication security between the vehicle's gateway and an external entity by applying a network security layer, such as transport layer security (TLS). There have also been various efforts to provide cyber-vehicle security, but they still lack support for secure data exchange between internal ECUs and external networks.

In this disclosure, a secure communication protocol is presented for exchanges between internal ECUs and external devices. The proposed protocol includes the translation and security of end-to-end communication between an external entity (e.g., the car maker's server) and in-vehicle components that cannot be achieved with a naïve approach such as TLS, mainly because the in-vehicle bus (e.g., CAN) and in-vehicle controllers are severely resource-limited. The proposed protocol is shown to be resilient against the message forgery and drop by a compromised gateway.

This section provides background information related to the present disclosure which is not necessarily prior art.

SUMMARY

This section provides a general summary of the disclosure, and is not a comprehensive disclosure of its full scope or all of its features.

A method is presented for exchanging data between a vehicle and an entity external to the vehicle. One aspect of the method is implemented by a gateway in the vehicle. The method includes: receiving a message broadcast by a sending controller residing in the vehicle, where the message includes a message identifier, payload data and a message authentication code such that the message identifier and the payload data are in a format defined by vehicle manufacturer and the message authentication code is generated by the sending controller using a content key shared between the sending controller and the external entity; extracting the message identifier and the payload data from the message; translating the message identifier and the payload data from the format defined by the vehicle manufacturer to an open format, where the open format differs from the format defined by the vehicle manufacturer; constructing another message for transmission to the external entity, where the another message includes the translated message identifier, the translated payload data and the message authentication code; and sending the another message via an external network to the external entity. Constructing the another message includes generating another message authentication code by hashing the payload data and an external sender key, where the external sender key is shared between the gateway and the external entity. The another message authentication code is preferably comprised of sixty four or more bits.

In another aspect, the gateway handles an incoming message from an entity external to the vehicle. The method includes: receiving an incoming message sent from an entity external to the vehicle, where the incoming message includes a message identifier, payload data and a message authentication code such that the message identifier identifies a recipient controller in the vehicle and the payload data formatted in accordance with an open format and the message authentication code is generated by the external entity using a sender key shared between the gateway and the external entity; extracting the payload data and the message authentication code from the incoming message; generating a message authentication code using the payload data and the sender key which is known to the gateway; and comparing the extracted message authenticated code to the generated message authentication code When the extracted message authentication code does not match the generated message authentication code, incoming message is discarded. On the other hand, the incoming message is processed further when the extracted message authentication code matches the generated message authentication code. Further processing of the incoming message includes: decrypting the incoming message using the sender key; translating the message identifier and the payload data from the open format to a format defined by the vehicle manufacturer; generating a new message authentication code by hashing the translated message identifier and the translated payload data; and broadcasting a new message on the vehicle network, where the new message is of the translated message identifier, the translated payload data and the new message authentication code.

In one embodiment, the message is broadcast over the vehicle network in accordance with Controller Area Network message protocol and the open format is further defined as one of JavaScript Object Notation or Extensible Markup Language.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Automotive systems are real-time systems, equipped with various controller or electronic control units (ECUs) which are interconnected via wireline serial data networks, such as Controller Area Networks (CAN), Local interconnect network (LIN), and FlexRay. CAN has become the de facto standard for in-vehicle communications due to its low cost and widespread deployment. While reference is made to CAN throughout this application, it is readily understood that the concepts presented herein extend to other types of serial network protocols.

In-vehicle networks use the multi-master model. Every frame is broadcast on the bus, and every controller (e.g., ECU) listens to it and grabs only relevant frames by comparing their IDs (i.e., the arbitration field in each frame) with those stored in the message/frame filter. CAN allows up to 64 bits for data and provides a 16-bit CRC field (with a 1-bit CRC delimiter) to check the integrity of each received frame as seen in the frame format shown in FIG. 1. Since the bus speed is only up to 1 Mbps, 30-40% of which is commonly utilized, it is important to use less bits of data in each frame. In CAN, in-vehicle data is treated as the car-maker's proprietary information. Each car manufacturer uses its own semantic for the CAN ID and payload, hence concealing its proprietary information.

The vehicle connectivity requires knowledge of CAN data for its intended use, forcing car makers to seek ways to make the data available without exposing its proprietary information to unauthorized entities. In addition, there is a large gap between in-vehicle and external networks, such as IP-based networks. In one approach, car makers deploy ECUs with external interfaces as a gateway (GW) to communicate with the external world.

Figures 1, 2:
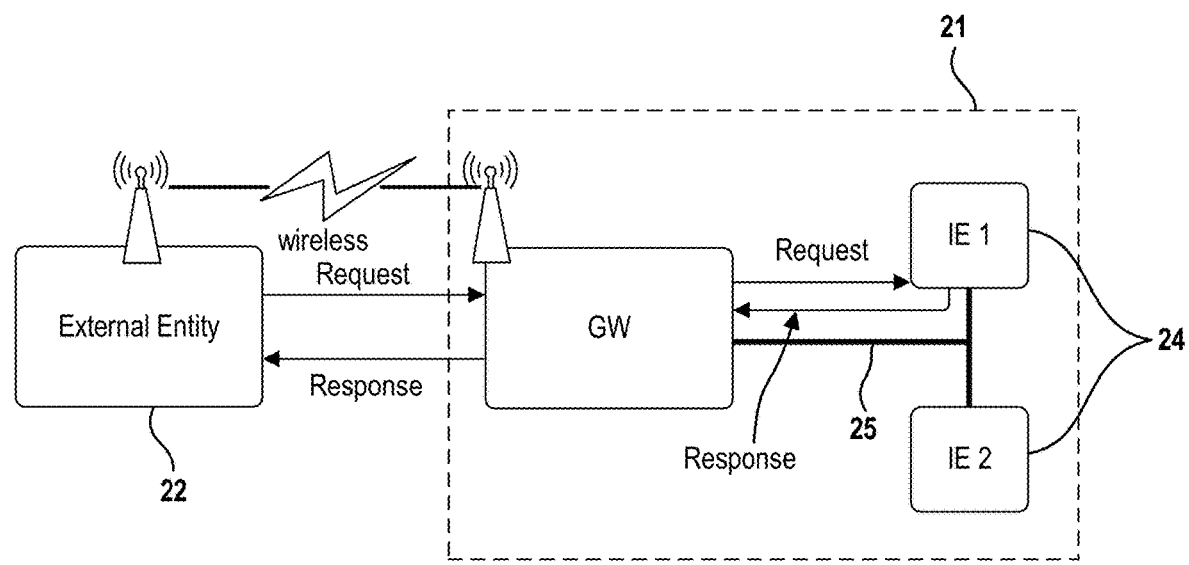
FIG. 1 is a diagram depicting an example CAN frame format.
FIG. 2 is a diagram depicting a proposed system model for exchanging data between a vehicle and an external entity.

FIG. 2 illustrates a proposed system model for exchanging data between a vehicle 21 and an external entity 22. The vehicle 21 houses a gateway 23 and two or more electronic control units (ECUs) 24 interconnected by a vehicle network 25. The objective of this system model is for car makers to share information with authorized external entities without revealing their proprietary assets.

Two ways of utilizing the internal vehicle data while concealing the original format are encapsulation and translation. Encapsulation is commonly used in computer networks. The original data is masked until the authorized entity receives it. Message encryption is an example of encapsulation. However, encapsulation is difficult to use for the case when an entity wanting to use the data is not authorized to know the original CAN raw data. Usually, a large number of cars from various car makers are on the road. Thus, data translation is considered as a practical solution, converting the original data format to another. However, there is a serious security risk in data translation which is commonly referred to as "bogus interpreter problem".

Figure 3:
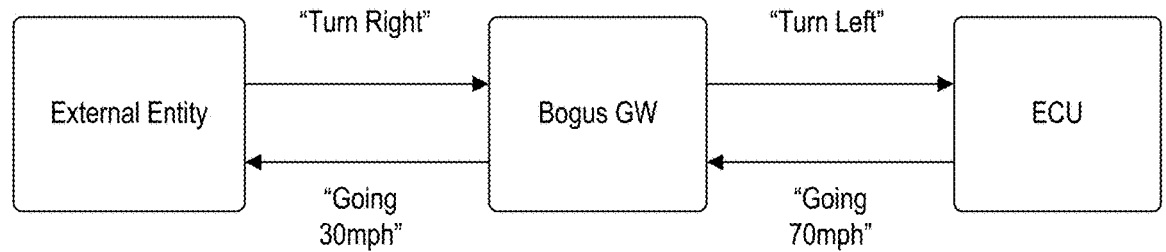
FIG. 3 is a diagram showing how a bogus gateway can change message content.

Since the gateway is the conduit to external networks, it can be the primary target by the cyber attackers. Referring to FIG. 3, a compromised gateway can turn into an attacker injecting messages into in-vehicle networks which is called the "bogus interpreter" problem. The design requirements for combating this problem are discussed below. A compromised gateway may forge the original message, delay or even drop it. Since the original message format is not preserved, recipients cannot know whether the received messages are genuine, and the senders cannot know whether the messages are delivered to their intended receivers.

To prevent the bogus interpreter problem, the security architecture needs to meet the following design requirements. First, the receiver ECUs must be able to determine if messages in in-vehicle networks are from a valid sender ECU. Second, when messages are transmitted through the gateway, the receivers, external entities or ECUs should be able to determine their validity. Third, either ECUs or external entities should be able to determine if messages are properly communicated to the intended receivers through the gateway.

Figure 5:
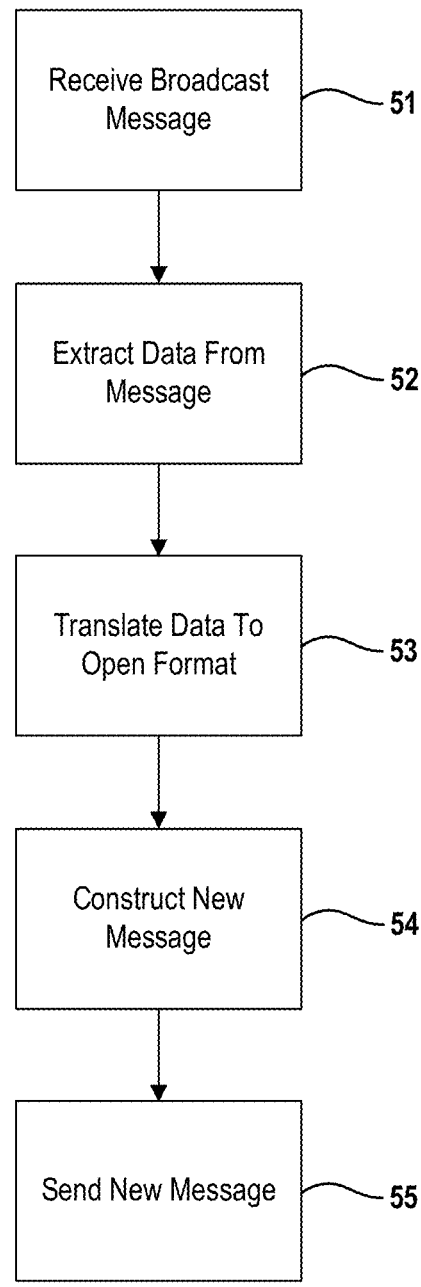
FIG. 5 is a flowchart providing an overview of a method for exchanging data between a vehicle and an external entity.

FIG. 5 provides an overview of an example method for exchanging data between a vehicle and an entity external to the vehicle. A gateway residing in the vehicle serves as an intermediary between vehicle ECUs and the external entity. In one embodiment, the gateway is implemented by an ECU having an external interface, such as a WiFi or Bluetooth interface. Other types of interfaces are also contemplated by this disclosure.

Figure 4:
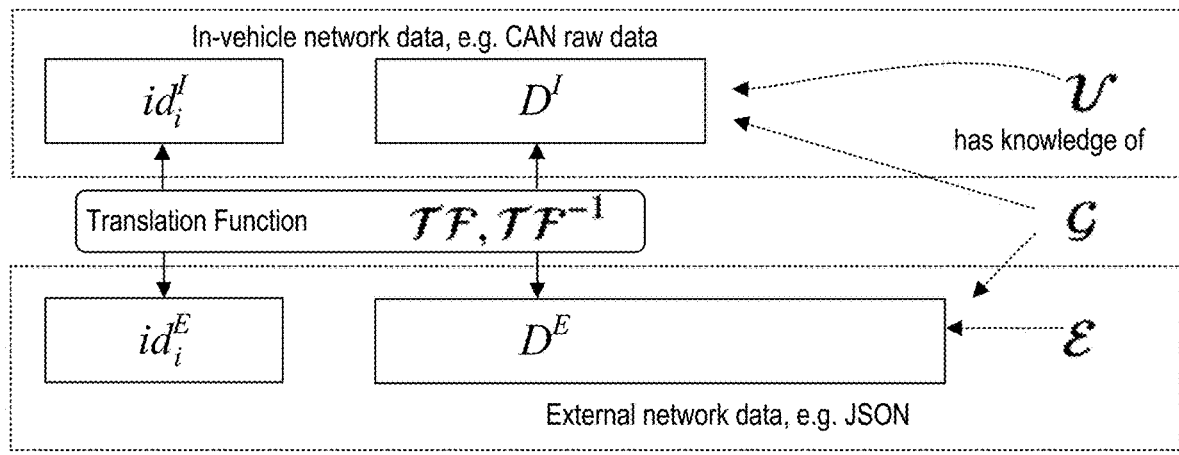
FIG. 4 is a diagram illustrating the information flow between an internal ECU and an external ECU.

The gateway first receives at 51 a message broadcast on the vehicle network by a sending controller. The message includes a message identifier, payload data and a message authentication code, such that the message identifier and the payload data are in a format defined by vehicle manufacturer and the message authentication code is generated by the sending controller. The message authentication code is generated by the sending controller using a content key shared between the sending controller and the external entity. Within the proposed system model, these data types are shown in FIG. 4 with a listing of their notations set forth in the table below.

TABLE 1

Notations

| Type | Description |
|---|---|
| $id_i^I$ | Message ID i in the in-vehicle network. e.g., CAN frame ID defined by automotive manufacturers |
| $id_i^E$ | Message ID i in the external network, associated with $id_i^I$. |
| $\mathcal{D}^I$ | Data in the in-vehicle network. e.g., CAN raw data |
| $\mathcal{D}^E$ | Common type data. We use JSON in this disclosure |
| $\mathcal{U}_i$ | Internal ECU i, only connected to the in-vehicle network. |
| $\mathcal{G}$ | Gateway, connected to both in-vehicle and external networks |
| $\mathcal{E}$ | External entity |
| $\mathcal{TF}$ | Translation function. $\mathcal{D}^I \rightarrow \mathcal{D}^E$ |
| $\mathcal{TF}^{-1}$ | Inverse translation function: $\mathcal{D}^E \rightarrow \mathcal{D}^I$ |

Figure 6:
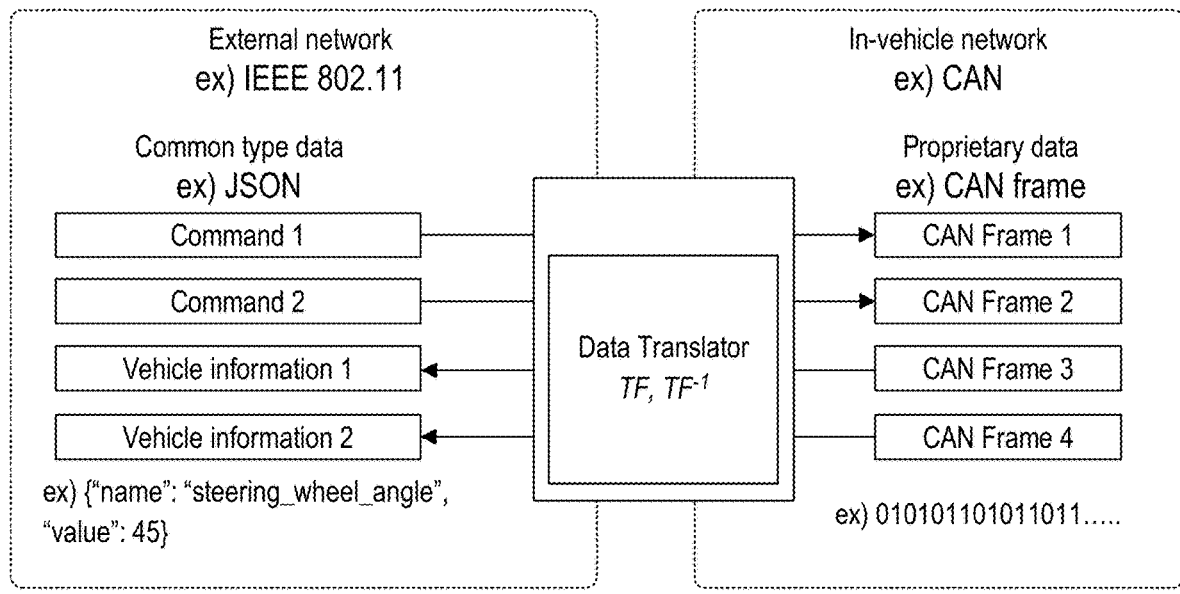
FIG. 6 is a diagram depicting a data translator in the gateway that enables data exchange in different formats.

Upon receipt of the message, the gateway in turn extracts 52 the message identifier and the payload data from the message and translates 53 the message identifier and the payload data from the format defined by the vehicle manufacturer to an open format, where the open format differs from the format defined by the vehicle manufacturer. Example open format include but are not limited to JavaScript Object Notation (JSON) and Extensible Markup Language (XML). The format need not be open so long as it differs from the proprietary format defined by the vehicle manufacturer. An example data translator is illustrated in FIG. 6.

Next, the gateway constructs 54 a new message for transmission to the external entity. The new message includes the translated message identifier, the translated payload data and the message authentication code received from the sending controller. Lastly, the new message is sent by the gateway via the external interface to the external entity. It is to be understood that only the relevant steps of the data exchange are discussed in relation to FIG. 5, but that other software-implemented instructions may be needed to control and manage the overall data exchange.

This approach is built upon the following assumptions. First, the data exchange ECU and the gateway are equipped with cryptographic computation capabilities, as specified in the AUTOSAR (Automotive Open System Architecture) standards. Internal ECUs are trusted, as they are located inside of the vehicle, and are seldom changed and their access is limited during the vehicle's operation life. Physical hardware modifications are not considered in this disclosure. A trusted third party issues keys and has the knowledge of both in-vehicle data and common types, e.g., car makers know raw CAN data and its JSON translation.

Further description for an example embodiment of the data exchange protocol is set forth below. The data exchange, however, relies upon pre-distribution of keys and setup of a secure channel. A trusted third party (TTP) issues keys with different lifetimes to each entity. An example of a secure channel setup model is briefly described below. Further details regarding this secure channel setup model can be found in K. Han et al's article "On authentication in a connected vehicle: Secure integration of mobile devices with vehicular networks" Proceedings of ICCPS 2013, pages 160-169, April 2013 which is incorporated herein by reference.

Suppose ECU $\mathcal{U}_j$ in the in-vehicle network, where $1 \leq i$, $j \leq n$, $i \neq j$, and n is the number of ECUs with a security function. At first, the TTP randomly selects two long-term secret keys $lk_{i,j}$ and $lk_i^I$, where $lk_{i,j}$ is a shared key between $\mathcal{U}_i$ and $\mathcal{U}_j$, and $lk_i^I$ is a seed key for secure communication with the gateway. The TTP then deploys $lk_{i,j}$ and $lk_i^I$ in $\mathcal{U}_i$ during vehicle manufacturing. This stage is assumed secure, which is reasonable and easy to achieve.

For the gateway $\mathcal{G}$ to communicate $\mathcal{U}_1$, TTP first randomly selects $r_g$ and generates a timestamp $TS_g$, a midterm secret key $mk_1^I$ and a certificate $cert_1^g$ where $mk_1^I$=KDF $(lk_1^I|r_g$ and $cert_1^g$=h$\{lk_1^I, r_g|TS_g\}$, KDF is the key derivation function, and h$\{k, m\}$ is a MAC for message m with key k. For the other ECU $U_j$, the TTP generates $mk_i^I$ and $cert_i^g$ and also randomly selects $mk^E$ for communications with external entities.

$\mathcal{G}$ receives $r_g$, $TS_9$, a key set $MK^I$, a certificate set $CERT^g$, and a key $mk^E$ from TTP during the installation stage, where $MK^I$=$\{mk_i^I|0\leq i \leq n\}$, $CERT^g$=$\{cert_i^g|0\leq i \leq n\}$. This stage is also assumed to be secure.

Suppose an external entity E wants connection to the vehicle, thus requesting keys from the TTP. Upon receiving the request from $\varepsilon$, the TTP first randomly selects $r_e$ and a timestamp $TS_e$. Then, it generates a key set $SK^I$ and a certificate set $CERT^I$, where $SK^I$=$\{sk_i^I|1\leq i \leq n\}$, $CERT^I$=$\{cert_i^I|1\leq i \leq n\}$, $sk_i^I$=KDF($mk_i^I|r_e$), $cert_i^I$=h$\{lk_i^I, r_e|TS_e\}$. The TTP also generates a secret key $sk^E$ and a certificate $cert^E$, where $sk^E$=KDF($mk^E$, $r_e$), and $cert^E$=h$\{mk^E, \varepsilon|r_e|TS_e\}$.

Secure channel setup secures communications between internal ECUs and the external entity, secure channels between internal ECUs and the gateway over the in-vehicle network, and between the gateway and the external entity over an external network.

Let each $\mathcal{U}_i$ only accept $id_i^I$ and also $id_o^I$. When the gateway $\mathcal{G}$ is attached to the vehicle for the first time, $\mathcal{G}$ broadcasts authentication requests to the in-vehicle network as follows.

First, $\mathcal{G}$ broadcasts 64-bit $r_g$ and 32-bit $TS_g$ with $id_o^I$ to CAN bus. Then, $\mathcal{G}$ broadcasts n 64-bit certificates $cert_i^g$ with each $id_i^I$ to CAN bus. Since a modern vehicle is equipped with 70-100 ECUs, and $\mathcal{G}$ may broadcast 72 to 102 CAN frames on the bus, each $\mathcal{U}_i$ may receive three values: $r_g$, $TS_g$ and $cert_i^g$. After verifying $r_g$ and $TS_g$ with $cert_i^g$, each $\mathcal{U}_i$ generates $mk_i^*$ where $mk_i^*$=KDF$\{lk_i^I, r_g\}$ and $mk_i^*$≡$mk_i^I$. Note that $mk_i^*$ is valid until $TS_g$ expires.

Unlike the in-vehicle network, assume external networks support two-way communications. Let an external entity $\varepsilon$ attempt connection to the gateway $\mathcal{G}$. Then, $\varepsilon$ randomly selects a nonce $r_1$ and generates a challenge chal, where chal=enc($sk^E, r_1|h\{r_i\}$), and enc(k,m) denotes a function enc that encrypts a message m with key k, $\varepsilon$ then sends chal with $r_e$, $TS_e$ and $cert^E$ to $\mathcal{G}$.

After verifying cert$^E$, $\mathcal{G}$ generates sk* and decrypts chal with sk*. $\mathcal{G}$ then randomly selects $r_2$ and generates the response res, where res=h{sk*, $\mathcal{G}$ |ε|$r_e$|$r_1$|$r_2$}. $\mathcal{G}$ sends $r_2$ and res to ε.

After verifying res, ε generates a session key sk$^e$, where sk$^e$=KDF{sk$^E$,$r_e$|r*}. ε also generates the conformation con=h{sk$^e$,ε| $\mathcal{G}$ |r*|$r_e$}, and sends con to $\mathcal{G}$. $\mathcal{G}$ also generates sk$^e$, and verifies con. If con is verified, then $\mathcal{G}$ $\mathcal{G}$ stores sk$^E$ until $TS_e$ expires, and uses sk$^e$ as a session key.

Upon receiving CERT$^I$ from ε, $\mathcal{G}$ $\mathcal{G}$ broadcasts CERT$^I$ as follows: First, $\mathcal{G}$ $\mathcal{G}$ broadcasts 64-bit $r_e$ and 32-bit $TS_e$ with id$_o^I$ to CAN bus. Then, it broadcasts n 64-bit cert$_i^I$ to each $\mathcal{U}_i$. Optionally, $\mathcal{G}$ $\mathcal{G}$ also broadcasts n 64-bit proof$_i$ to each $\mathcal{U}_i$, where proof$_i$=h{$mk_i$, $r_e$|$TS_e$|cert$_i^I$}. $\mathcal{U}$ checks proof$_i$ and cert$_i^I$, and then derives sk$_i^I$. Other schemes for setting up a secure channel are contemplated by this disclosure and fall with in the broader aspects of this disclosure.

FIGS. 7-11 depict different portions of the data exchange protocol. The data exchange protocol is subdivided into reading information from the vehicle bus and requesting data from a vehicle ECU.

Figure 7:
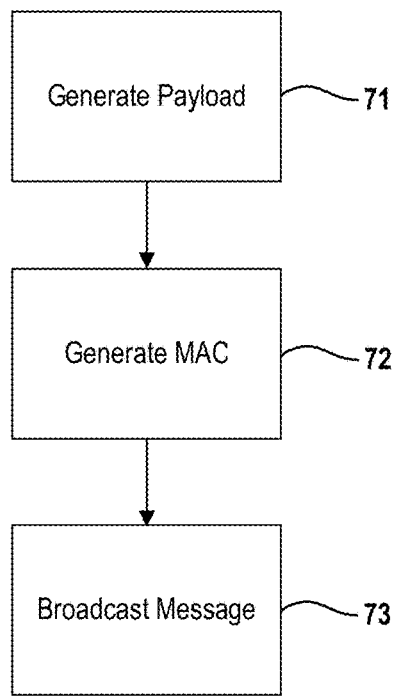
FIG. 7 is a flowchart depicting a method for in-vehicle communication between ECUs.

By way of background, in-vehicle communication between ECUs is shown in FIG. 7. For a given communication, an internal ECU will generate the payload data for the message as indicated at 71 and generate a message authentication code for the message at 72. In one embodiment, the message authentication code is generated by hashing the shared key received from the trusted third party and the payload data, where the shared key is shared by the sending ECU and intended recipient. Example hash functions may include but are not limited to MD5 or SHA-1. A message is then constructed and broadcasted at 73 on the vehicle network by the sending ECU. The message includes a message identifier (e.g., CAN frame id), the payload data and the message authentication code. In a similar manner, the internal ECU can also receive messages from other ECUs. An example algorithm for in-vehicle communications is set forth below.

| Algorithm 1 General in-vehicle communication |
| --- |
| 1: procedure In-Vehicle Communication |
| 2:     for $\mathcal{U}_i$, 1 ≤ i ≤ n, at frame count γ do |
| 3:         Generate $v_\gamma^i$ for id$_j^I$, 1 ≤ j ≤ n, i ≠ j |
| 4:         $\mathcal{A}_\gamma^i \leftarrow h\{lk_{i,j}, v_\gamma^i\}$ |
| 5:         Broadcast id$_j^I$, $v_\gamma^i$, $\mathcal{A}_\gamma^i$ to CAN bus |
| 6:     end for |
| 7:     for $\mathcal{U}_l$ do |
| 8:         if Read messages with id$_j^I$ then |
| 9:             if $\mathcal{A}_\gamma^i$ is valid then Accepts $v_\gamma^i$ |
| 10:             end if |
| 11:         end if |
| 12:     end for |
| 13: end procedure |

Figure 8:
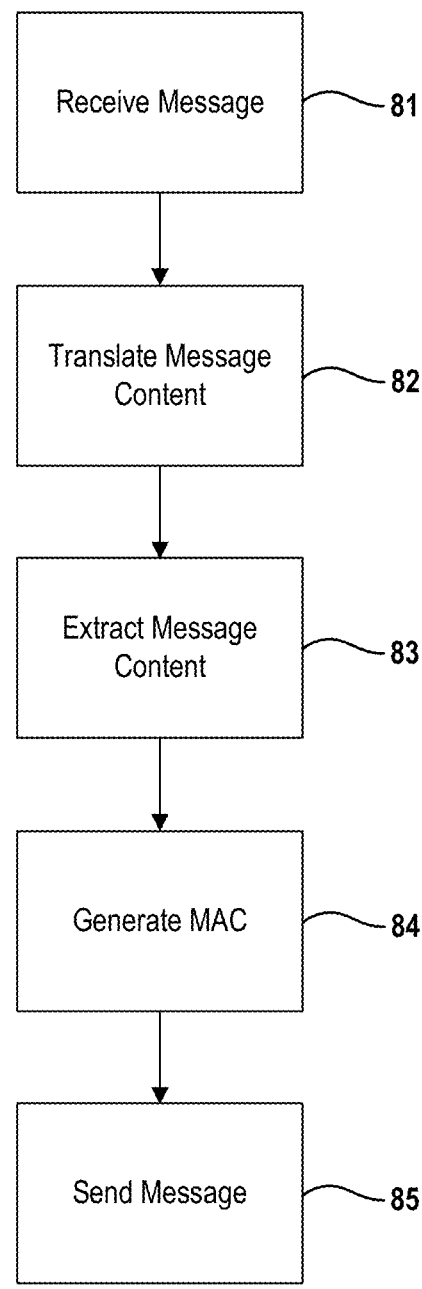
FIG. 8 is a flowchart depicting a method by which gateways extract messages from a vehicle bus.

FIG. 8 depicts a method by which the gateway extracts messages from the vehicle bus. The gateway is configured to read messages having one or more particular message identifiers. Upon receiving a message intended for the gateway at 81, the gateway proceeds to translate the message content as indicated at 82. Specifically, the message identifier and the payload data extracted from the received message are translated from the format defined by the vehicle manufacturer to an open format. A new message can then be constructed from the translated message identifier and the translated payload data. The new message may also include the message authentication code extracted directly from the received message.

Prior to sending the new message, the gateway may encrypt the new message at 83, for example using a secret key shared between the gateway and the external entity. In an example embodiment, the new message is encrypted using encryption algorithms such as AES (Advanced Encryption Standard). Additionally, the encrypted message may be hashed at 84 along with the shared secret key to generate a second message authentication code for the new message. In some embodiments, the size of the messages sent by the gateway to the external entity is larger than the message packets transmitted in the vehicle network. In this case, the gateway may append multiple messages together (e.g., see lines 6-8 of Algorithm 2) before sending a message to the external entity. To prevent modification of the message by a compromised gateway, the size of the appended message authentication codes is 64 bits or larger. That is, when the message authentication codes, $\mathcal{A}_\gamma^I$, from the multiple messages are appended together, the number of bits is preferably 64 or larger. For example, when the message authentication code for a CAN message is 16 bits, then four messages are preferably appended together by the gateway (i.e., 16×4=64 bits). When the message authentication code for a CAN message is 8 bits, then eight messages are preferably appended together by the gateway (i.e., 8×8=64 bits). Lastly, the new message is sent at 85 by the gateway to the external entity.

An example algorithm for extracting messages by the gateway from the vehicle bus is set forth below.

| Algorithm 2 Data extraction from Bus |
| --- |
| 1: procedure Data Extraction from the Bus |
| 2:     for $\mathcal{G}$ do |
| 3:         if read messages with id$_j^I$ then |
| 4:             {id$_j^E$, $\mathcal{D}_\gamma^E$} ← TF (id$_j^I$, $\mathcal{D}_\gamma^I$) |
| 5:             m$_\gamma$ = {id$_j^E$ | $\mathcal{D}_\gamma^E$ | $\mathcal{A}_\gamma^i$} |
| 6:             while the number of m$_\gamma$ < K do |
| 7:                 Put m$_\gamma$ into $\mathcal{M}^E$, $\mathcal{M}^E$ = [m$_\gamma$|1 ≤ γ ≤ K} |
| 8:             end while |
| 9:             $C^E \leftarrow enc(sk^e, \mathcal{M}^E)$(Encryption) |
| 10:            $\mathcal{A}^E \leftarrow h\{sk^e, \mathcal{G} | \varepsilon | C^E\}$ (MAC) |
| 11:            Send $\mathcal{G}$, ε, $C^E$, $\mathcal{A}^E$ to ε |
| 12:         end if |
| 13:     end for |
| 14: end procedure |

Figure 9:
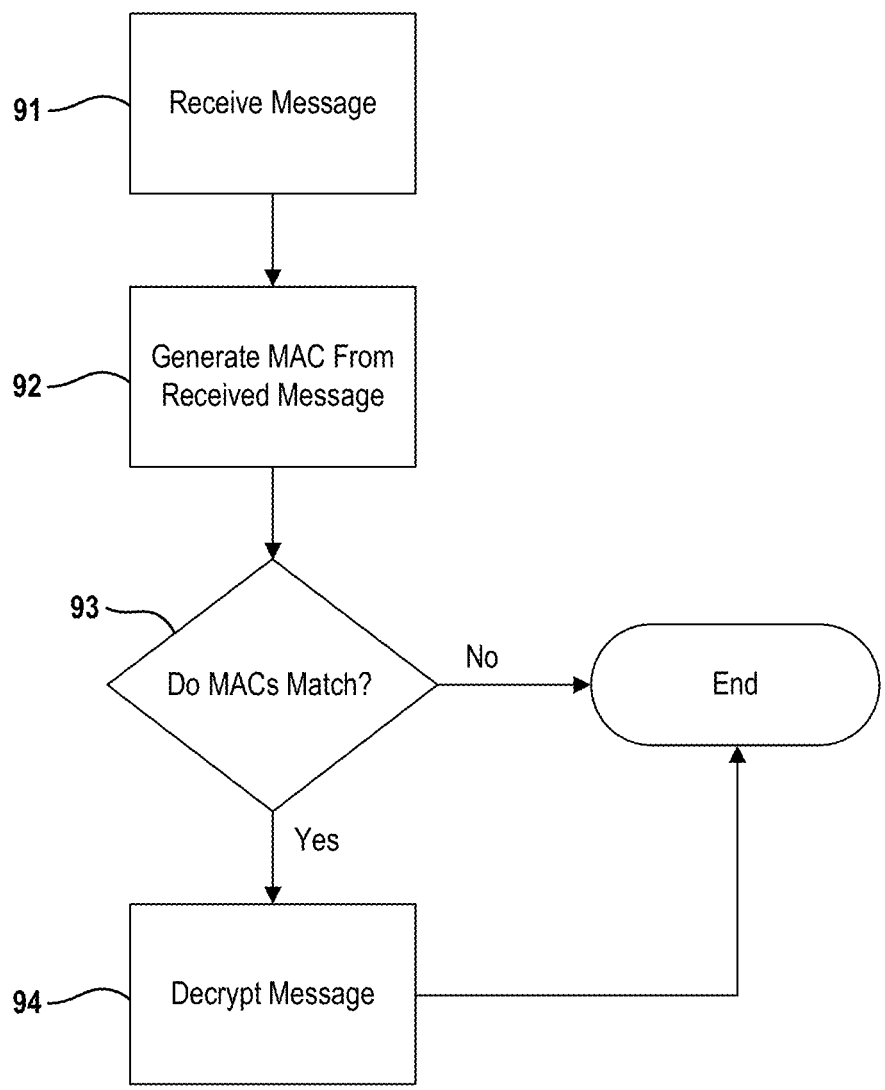
FIG. 9 is a flowchart depicting a method for verifying data received by an external entity.
Figure 10:
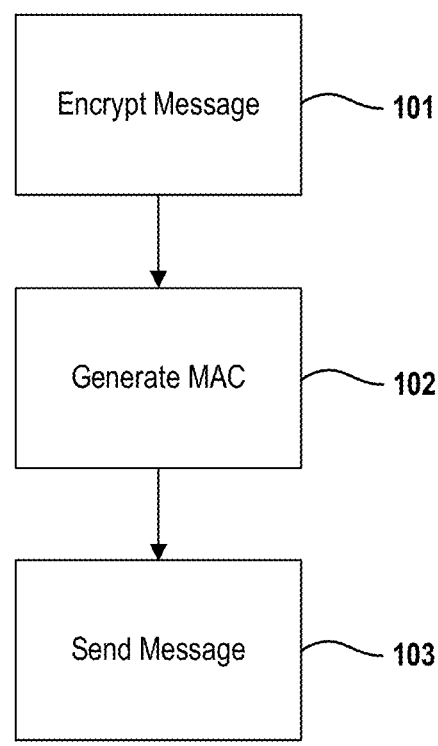
FIG. 10 is a flowchart depicting a method for sending a request to a gateway by an external entity.

FIG. 9 depicts a method for verifying the data received by the external entity from the gateway. Upon receiving the message at 91, the external entity generates a message authentication code at 92 from the received message. In particular, the encrypted data is retrieved from the received message and a hash function is applied to the encrypted data and to the secret key shared between the gateway and the external entity. It is noted that the hash function is the same function as was applied to generate the message authentication code at the gateway. The generated message authentication code is then compared at 93 with the message authentication code received in the message. If the codes match, then the gateway is a trusted sender. The external entity can proceed to decrypt the message content as indicated at 94; otherwise, the message is discarded.

The external entity may also verify the authenticity of the message content. The external entity, however, is not likely privy to the format of the vehicle manufacture and its proprietary protocols. Therefore, the external entity sends the decrypted message to the trusted third party which has been entrusted with the proprietary protocols of the vehicle manufacturer. The trusted third party can in turn validate the message authentication code (i.e., MAC1) which was derived using the content key shared between the sending controller and the external entity (e.g., see lines 10-17 of Algorithm 3). When the derived message authentication code matches the message authentication code extracted from the message, the content of the message has also been verified and the external entity is notified by the trusted third party. In this case, the external entity can proceed to process the message content. In some instance, the derived message authentication code does not match the message authentication code extracted from the message, for example if the gateway has been compromised. In these instances, the external entity is notified by the trusted third party and the message is discarded and/or other corrective action taken (e.g., shutting down the gateway).

An example algorithm for verifying data at the external entity is set forth below.

| Algorithm 3 Translated data verification |
| --- |
| procedure Translated data verification |
|   for $\epsilon$ do |
|     $\mathcal{A}^* \leftarrow h\{sk^e, \mathcal{G} \mid \epsilon \mid C^E\}$ |
|     if $\mathcal{A}^E \equiv \mathcal{A}^*$ then |
|       Retrieve $\mathcal{M}^E$ by decrypting $C^E$ |
|       Send $\mathcal{M}^E$ to TTP |
|     end if |
|   end for |
|   for TTP do |
|     if Receive $\mathcal{M}^E$ from $\epsilon$ then |
|       $\mathcal{D}'_y \leftarrow TF^{-1}(\mathcal{D}^E_y)$ |
|       $\mathcal{A}'_y \leftarrow h\{lk_{i,j}, \mathcal{D}'_y\}$ |
|       If $\mathcal{A}'_y \equiv \mathcal{A}'_r$, where $1 \leq y \leq K$ then |
|         Return VALID. |
|       end if |
|     end if |
|   end for |
| end procedure |

Collectively, these methods provide a method for communicating information from the vehicle bus via a gateway to an external entity.

Conversely, an external entity may send a request for information to the gateway. In this case, the external entity sends a request to the gateway as described in relation to FIG. 10. Before doing so, the external entity obtains a certificate from a trusted third party. Again, the external entity is not likely privy to the format of the vehicle manufacture and its proprietary protocols. Therefore, the external entity gets the certification from the trusted third party which has been entrusted with the proprietary protocols of the vehicle manufacturer. The certificate is based on message identifier for the external entity and the payload data being sent to the gateway (e.g., see lines 5-10 of Algorithm 4). In the example embodiment, the certificate is equivalent to MAC1 and constructed in the same manner as described above in relation for algorithm 1. The certificate is then sent by the trusted third part back to the external entity.

After receiving the certificate, the external entity encrypts the data request at 101 using the certificate and a secret key shared between the gateway and the external entity. The external entity also generates a message authentication code at 102 by hashing the message content along with the shared secret key. The data request, along with the message authentication code, is sent at 103 by the external entity to the gateway. An example algorithm for sending the data request is set forth below.

| Algorithm 4 Sending data request to gateway |
| --- |
| 1:   procedure Send data request to the gateway |
| 2:     for $\epsilon$ do Contact TTP |
| 3:       Get authorization of $\mathcal{D}^E$ for $id_i^E$ |
| 4:     end for |
| 5:     for TTP do |
| 6:       Find $id_1^I$ relevant to $id_i^E$ |
| 7:       $\mathcal{D}^I \leftarrow TF^{-1}(\mathcal{D}^E)$ |
| 8:       $cert_i^I \leftarrow h\{lk_i^I \mid \mathcal{D}^I\}$ |
| 9:       Send $cert_i^I$ to $\epsilon$ |
| 10:    end for |
| 11:    for $\epsilon$ do |
| 12:      $C^e \leftarrow enc(sk^e, id_i^E \mid D^E \mid cert_i^I)$ |
| 13:      $\mathcal{A}^e \leftarrow h\{sk^e, \epsilon \mid C^e\}$ |
| 14:      Send $C^e, \mathcal{A}^e$ to $\mathcal{G}$ |
| 15:    end for |
| 16:   end procedure |

Figure 11:
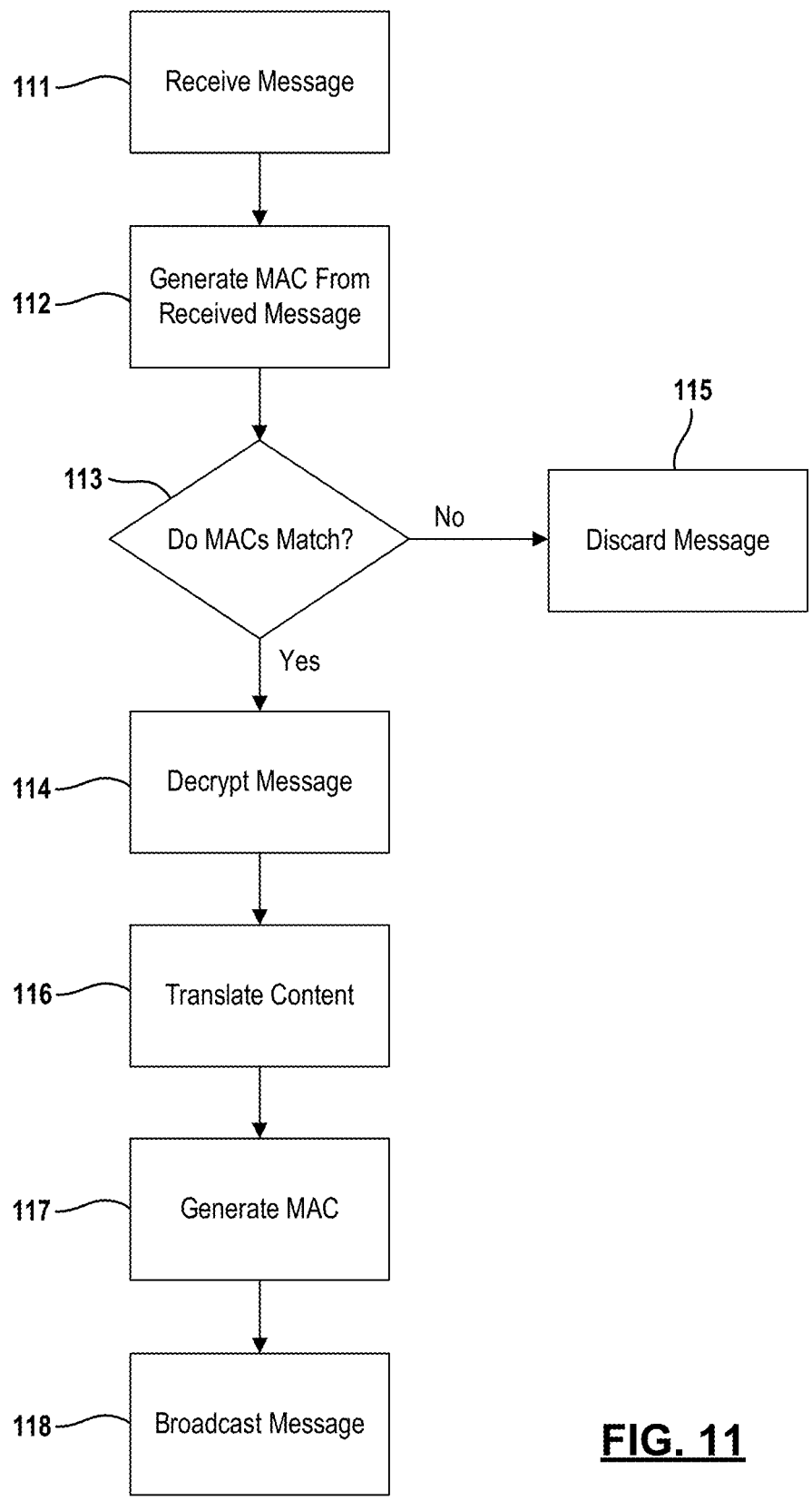
FIG. 11 is a flowchart depicting a method for relaying a data request from an external entity to an internal ECU.

The gateway in turn relays the data request to the intended ECU as shown in FIG. 11. Upon receiving the message at 111, the external entity generates a message authentication code at 112 from the received message. In particular, the encrypted data is retrieved from the received message and a hash function is applied to the encrypted data, along with a secret key shared with the external entity. It is noted that the hash function is the same function as was applied to generate the message authentication code at the external entity. The generated message authentication code is then compared at 113 with the message authentication code received in the message. If the codes match, then the external entity is a trusted sender and the gateway proceed to decrypt the message content as indicated at 114; otherwise, the message is discarded as indicated at 115. The gateway proceeds to translate the message content as indicated at 116. Specifically, the message identifier and the payload data extracted from the received message are translated from the open format (e.g., JSON) to the format defined by the vehicle manufacturer. A new message authentication code is also generated at 117 by hashing the translated message identifier, the translated payload data, the certification extracted from the received message and a mid-term secret key shared by the trusted third party. From the translated message identifier, the translated payload data, the certificate extracted from the received message and the new message authentication code, a new message is constructed and broadcast at 118 by the gateway on the vehicle network.

An example algorithm for relaying the message to an intended ECU is set forth below.

| Algorithm 5 Inject data request to ECU |
| --- |
| 1:   procedure Inject request to ECU |
| 2:     for $\mathcal{G}$ do |
| 3:       if Receive $\mathcal{G}, \mathcal{A}^e$ then |
| 4:         $\mathcal{A}^* \leftarrow h\{sk^e, \epsilon \mid C^e\}$ |
| 5:         if $\mathcal{A}^e \equiv \mathcal{A}^*$ then |
| 6:           $(id_i^E, \mathcal{D}^E, cert_i^I) \leftarrow dec\{sk^e, C^e\}$ |
| 7:           $(id_i^I, \mathcal{D}^I) \leftarrow TF^{-1}(id_i^E, \mathcal{D}^E)$ |
| 8:           $\mathcal{A}_i^I \leftarrow h\{mk_i^I, id_i^I \mid cert_i^I \mid \mathcal{D}^I\}$ |
| 9:           Broadcast $id_i^I, \mathcal{D}^I, cert_i^I, \mathcal{A}_i^I$ |
| 10:        end if |
| 11:       end if |
| 12:     end for |
| 13:     for $\mathcal{U}_1$ do |
| 14:       if Receive messages with $id_1^I$ then |
| 15:         Verify $\mathcal{A}_i^I$ and $cert_i^I$ |
| 16:         if $\mathcal{A}_i^I$ and $cert_i^I$ are valid then |
| 17:           Accept $\mathcal{D}^I$ |
| 18:         end if |
| 19:       end if |

-continued

Algorithm 5 Inject data request to ECU

| 20: | end for |
| 21: | end procedure |

Handling of the message received by the intended ECU is also described in the algorithm above (e.g., see lines 13-20).

Upon receiving a valid request, an ECU sends the requested data via the gateway back to the external entity. An additional message authentication code ($A^g$) is included in the reply message but otherwise the formulation of the reply message is substantially similar to the steps described in relation to Algorithm 1 (e.g., see lines 2-9 of Algorithm 6). The gateway in turn sends the message to the external entity. Assuming the additional message authentication code is valid, the message payload is translated from the format defined by the vehicle manufacturer to the open format. Along with a session key, the translated message identifier, the translated message payload and the message authentication code for the ECU are encrypted and a new authentication code is generated using the encrypted message. The encrypted message and the new authentication code are finally sent to the external entity. An example algorithm for relaying the message to an intended ECU is set forth below.

Algorithm 6 Data Extraction from ECU

| 1: | procedure Data Extraction from ECU |
| 2: | for $\mathcal{U}_1$ do |
| 3: |   if Receive authorized request from ε then |
| 4: |     Generate $\mathcal{D}^I$ |
| 5: |     $\mathcal{A}^e \leftarrow h\{lk^I|\mathcal{D}^I\}$ |
| 6: |     $\mathcal{A}^g \leftarrow h\{mk^I|\mathcal{D}^I|\mathcal{A}^e\}$ |
| 7: |     Broadcast $id_g^{\mathcal{U}}|\mathcal{D}^I, \mathcal{A}^e, \mathcal{A}^g$ to CAN bus |
| 8: |   end if |
| 9: | end for |
| 10: | for $\mathcal{G}$ do |
| 11: |   if $\mathcal{A}^g$ is valid then |
| 12: |     $\mathcal{D}^E \leftarrow TF(\mathcal{D}^I)$ |
| 13: |     $C^E \leftarrow enc\ (sk^e, id_I^E|D^E|\mathcal{A}^e)$ |
| 14: |     $\mathcal{A}^E \leftarrow h\{sk^e, C^E\}$ |
| 15: |     Send $C^E, \mathcal{A}^E$ to ε |

Security of the proposed protocol was evaluated in relation to combatting a compromised gateway, or the bogus interpreter. Suppose the compromised gateway $Adv^g$ attempts to forge the communication messages between $\mathcal{U}_i$ and $\mathcal{U}_j$ and sends a bogus message to an external entity or to an internal ECU, or issues unauthorized/garbage messages to $\mathcal{U}_i$ or even drop/delay messages.

$Adv^g$ can proceed with fake translation of the in-vehicle data $\mathcal{D}^I$ to $\mathcal{D}^{F,E}$. To succeed in this attack, $Adv^g$ generates $A^{F,I}, A^{F,J} \equiv A^{*,J}$ without knowledge of $lk_{i,j}$ where $A^{*,J} \equiv h\{lk_{i,j}, \mathcal{D}^{F,E}\}$. While $Adv^g$ sends a set of message $\mathcal{M}^E$ and a set of MACs $A^E$, $Adv^g$ has to generate $\mathcal{K}$ $A^{F,J}$s. For example, compromising 64 different 3-bit $A^{F,J}$s is difficult to break 160 bit SHA-1, making the attack infeasible.

$Adv^g$ may forge the information from E and send the fake translation $\mathcal{D}^{F,J}$ to $\mathcal{U}$. To mount this attack, $Adv^g$ has to generate a 16 or 32-bit $cert^F$ without knowing $lk_i^I$, where $cert^F \equiv cert_i^t$ and $cert_i^t = h\{lk_i^I|\mathcal{D}^{F,J}\}$. Thus, this attack is practically infeasible.

$Adv^g$ may attempt to generate and send fake information to $\mathcal{U}_i$. In this attack, $Adv^g$ can generate the fake message $\mathcal{D}^{F,J}$ and $cert^F$. However, as in the previous case, $Adv^g$ also has to generate $cert^F$ without knowing $lk_{i,j}$, making the attack practically infeasible.

$Adv^g$ may attempt to drop messages between ε and $\mathcal{U}_i$. Although internal ECUs cannot notice whether $Adv^g$ dropped messages or not, ε can notice if the attack is mounted. For example, ε has a rule that it receives messages from $\mathcal{G}\mathcal{G}$ periodically, or receives response upon request within a certain time.

Since CAN data are proprietary for car manufacturers and hence unavailable, a CAN frame format, called RTCL-CAN, was designed based on the public information made available by Ford Motor Company. Table 2 lists the CAN frame definitions of RTCL-CAN. RTCL-CAN defines 19 types of information including steering wheel angle, torque at transmission, engine speed, and so on.

TABLE 2

RTCL-CAN frames

| Data type | Identifier | data bits | T ms | Frame bits | Data type | Identifier | data bits | T ms | Frame bits |
| --- | --- | --- | --- | --- | --- | --- | --- | --- | --- |
| steering_wheel_angle | 0x030 | 11 | 100 | 60 | torque_at_transmission | 0x035 | 12 | 100 | 60 |
| engine-speed | 0x055 | 14 | 100 | 60 | vehicle_speed | 0x065 | 10 | 100 | 60 |
| accelerator_pedal_position | 0x020 | 7 | 100 | 52 | parking_brake_status | 0x00001 | 0 | 1000 | 44 |
| brake_pedal_status | 0x00010 | 0 | 1000 | 44 | transmission_gear_position | 0x006 | 4 | 1000 | 52 |
| Odometer | 0x10011 | 34 | 100 | 84 | ignition_status | 0x00011 | 2 | 1000 | 52 |
| fuel_level | 0x01101 | 7 | 500 | 52 | fuel_consumed_since_restart | 0x10010 | 36 | 100 | 84 |
| door_status | 0x10001 | 4 | 1000 | 52 | headlamp_status | 0x00100 | 1 | 1000 | 52 |
| high_beam_status | 0x00101 | 0 | 1000 | 44 | windshield_wiper_status | 0x00111 | 1 | 1000 | 52 |
| Latitude | 0x01111 | 12 | 1000 | 60 | longitude | 0x01110 | 13 | 1000 | 60 |
| button_event | 0x10000 | 6 | N/A | 52 | | | | | |

-continued

Algorithm 6 Data Extraction from ECU

| 16: | end if |
| 17: | end for |
| 18: | end procedure |

Each data in RTCL-CAN can be translated to/from JSON by the gateway $\mathcal{G}\mathcal{G}$ and TTP using TF and $TF^{-1}$. An example of this translation is illustrated below. As shown in Table 2 above, a frame for controlling the transmission gear position has CAN ID 0x06 and 4-bit data. It has 8 different states as shown in Table 3. Note the translation rule in this table is only for illustration, and the actual rules are proprietary to vehicle manufacturers and hence unavailable.

TABLE 3

| Data | Status | Data | Status | Data | Status | Data | Status |
|---|---|---|---|---|---|---|---|
| 0000 | neutral | 0001 | first | 0010 | second | 0011 | third |
| 0100 | fourth | 0101 | fifth | 0110 | sixth | 0111 | seventh |
| 1000 | eighth | 1001 | reserve | 1010 | reserve | 1011 | reserve |
| 1100 | reserve | 1101 | reserve | 1110 | reserve | 1111 | reserve |

Figure 12:
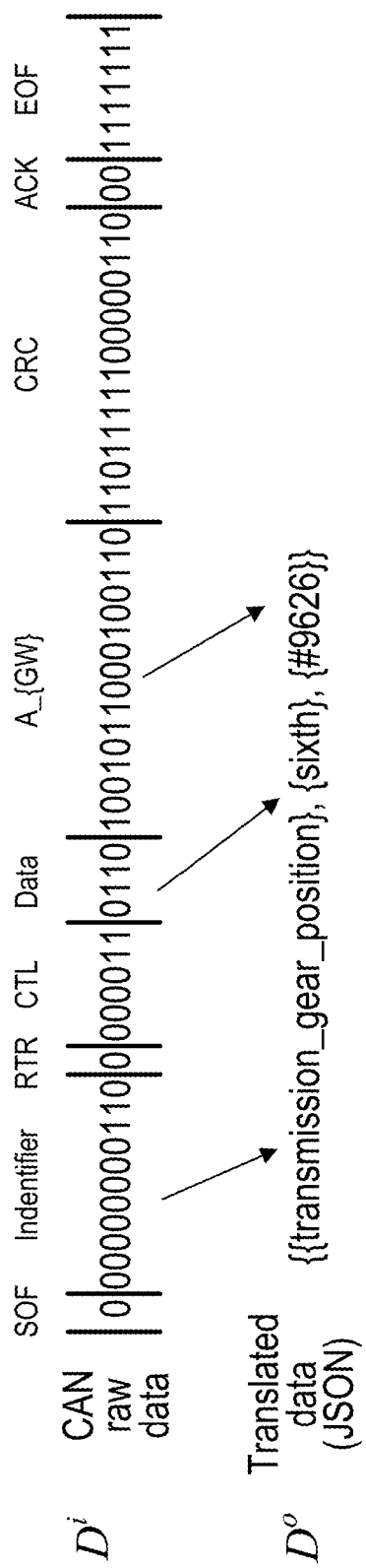
FIG. 12 is a diagram showing an example CAN translation: transmission gear position at "sixth".

FIG. 12 shows how CAN raw data of the transmission gear position is set to 'sixth.' In the raw CAN data $\mathcal{D}^I$, SOF and EOF fields are fixed, and RTR is also set to '0' for a data frame. ID '00000000110' indicates that the frame is for the transmission gear position. Data field contains '0110' and MAC. $\mathcal{G}$ $\mathcal{G}$ converts $\mathcal{D}^I$ to the translated format $\mathcal{D}^E$. $\mathcal{G}$ $\mathcal{G}$ translates the data with 'transmission-gear-position', 'sixth' using Table 3 and $A^I$.

Figure 13:
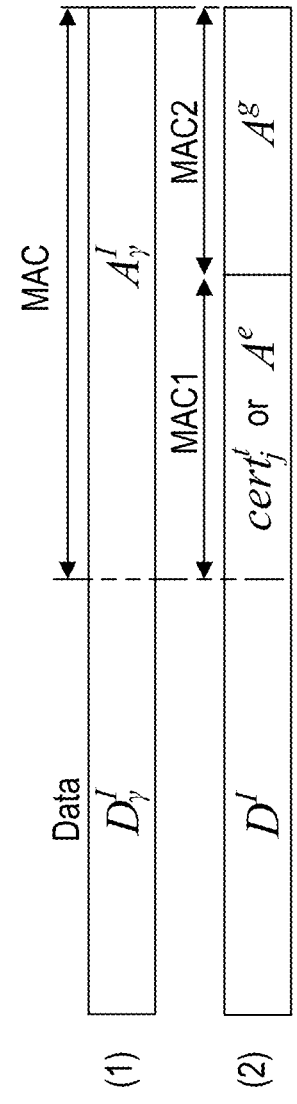
FIG. 13 is a diagram depicting two example MACs.

When ε sends a command {{transmission-gear-position}, {neutral}} to $\mathcal{G}$, $\mathcal{G}$ translates it to '0x006' and '0000'. Since CAN only provides up to 64 bits of data, it is not possible to assign a full-size MAC; for example, HMAC with SHA-1 generates 160-bit hash outputs. Thus, truncated MACs are assigned for CAN, e.g., $A_\gamma^I$ or $A^g$. Two types of MAC as shown in FIG. 13: (1) MAC for the sniffing case and (2) MAC for the messages on request. Note that external networks, such as $A^E$, utilize full-size MACs.

Figure 14:
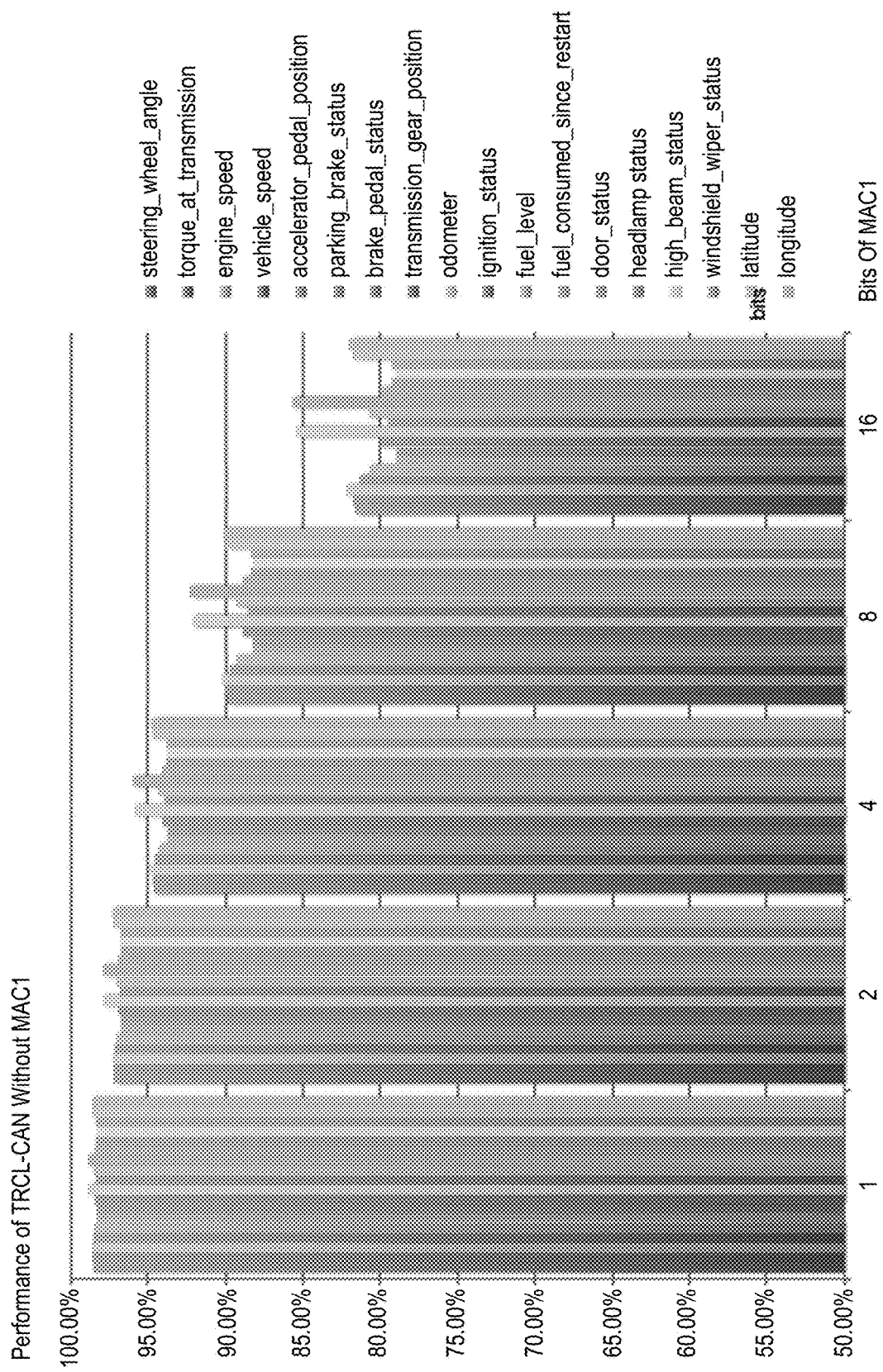
FIG. 14 is a graph comparing performance of MAC1 with different sizes with a 16-bit MAC2.

In-vehicle communication overhead of the protocol is evaluated for different sizes of MAC 1. The overhead of MAC 2 is the same as other general models. FIG. 14 shows the comparison of performance for different MAC sizes in RTCL-CAN of Table 2 during a 1-second period. Assigning 1 bit to MAC 1 with 16-bit MAC 2 yields 98.70% of performance of the original RTCL-CAN with a 16-bit MAC. Assigning 2, 4, 8, and 16 bits shows 97.43, 94.98, 90.45 and 82.56% of the original RTCL-CAN, respectively.

While the above results shown that assigning 1-bit MAC 1 provides the best performance, one also has to consider the external communication overhead. The size of set $\mathcal{M}^E$, is determined based on the size of MAC 1. The size of MAC is recommended to be more than 64 bits to achieve the practical security strength. Thus, assigning 1 bit for MAC 1 requires 64≤n at a time. For example, RTCL-CAN generates 82 messages per second and approximately an 8.2-Kbyte message can be transmitted at a time over external networks. The probability of $Adv^g$'s success in compromising RTCL-CAN is $½^{82}$ with 1-bit MAC 1. However, sending large-size $\mathcal{M}^E$ could degrade performance, since ε discards the entire set of messages even when one of many messages transmitted over the external network is found to have been compromised.

In contrast, assigning a larger-size MAC 1 ($A_\gamma^I$) reduces potential transmission overhead over the external network, although it incurs slight performance degradation in CAN.

Figure 15:
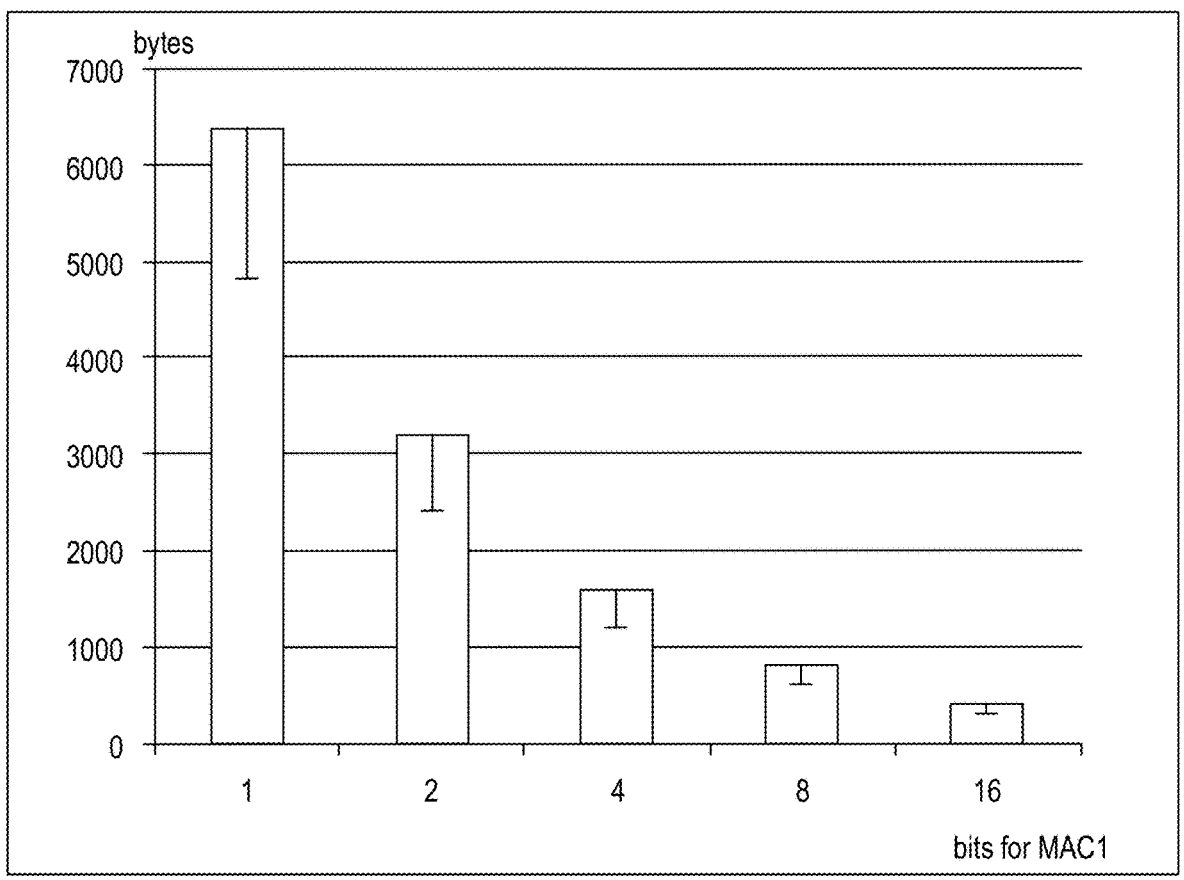
FIG. 15 is a graph showing the minimum size of $\mathcal{M}^E$ that G transmits to ε over external networks at a time.

FIG. 15 shows the data transmission overhead for different sizes of MAC 1. Although assigning 16 bits to MAC 1 incurs approximately 18% performance degradation in CAN, it provides not only 16× better efficiency for transmission than assigning 1 bit, but also enables detection of compromised $D_\gamma^E$ in $\mathcal{M}^E$.

The bit assignment depends on the underlying network environment. For example, implementing CAN-FD or FlexRay allows more bits for MAC 1. Also, implementing fastener technologies such as LTE, LTE-A as external networks supports larger $\mathcal{M}^E$.

Urban areas generally have better network connectivity, so assigning a smaller MAC in each CAN frame will preserve the performance of the in-vehicle network. In contrast, rural areas may only support poor connectivity, so assigning a larger MAC could preserve the performance in external networks.

The computation overhead is a critical issue to powertrain control systems and SAE specifies 1 ms as an allowable delay for safety-critical control systems. In the proposed protocol, $U_i$ only needs 2 hash computations (2H) to authenticate a message $U_i$ generates $A^I$ and $A^g$, and verifies cert and $A^I$. Thus, we evaluated the overheads on two industry-use processors; 32-bit MIPS (Chipkit MAX32) and ARM Cortex M3 (LPC1768) as $U_i$ by implementing the HMAC-SHA1 function. The time for 2H only takes about 460 μs 45 μs and which is far below the 1 ms requirement.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for exchanging data between a vehicle and an entity external to the vehicle, comprising:
   receiving, at a gateway in the vehicle, a message broadcast via a vehicle network from a sending controller residing in the vehicle, where the message includes a message identifier, payload data and a message authentication code such that the message identifier and the payload data are in a format defined by vehicle manufacturer and the message authentication code is generated by the sending controller using a content key shared between the sending controller and the external entity;
   extracting, by the gateway, the message identifier and the payload data from the message;
   translating, by the gateway, the message identifier and the payload data from the format defined by the vehicle manufacturer to an open format, where the open format differs from the format defined by the vehicle manufacturer;
   generating, by the sending controller, another message authentication code by hashing the translated payload data and an external sender key, where the external sender key is shared between the gateway and the external entity;
   constructing, by the gateway, another message for transmission to the external entity, where the another message includes the translated message identifier, the translated payload data, the message authentication code and the another message authentication code; and
   sending, by the gateway, the another message via an external network to the external entity;
   receiving, by the gateway, an incoming message from the external entity, where the message includes a message identifier, payload data and a message authentication code such that the payload data is in the open format and the message authentication code is generated by the external entity;
   extracting, by the gateway, the payload data and the message authentication code from the incoming message;
   generating, by the gateway, a message authentication code by applying a hash function to the payload data and a sender key, where the sender key is shared between the gateway and the external entity;
   comparing, by the gateway, the extracted message authenticated code to the generated message authentication code;
   continue processing the incoming message by the gateway in response to the extracted message authentication code matching the generated message authentication code; and
   discarding, by the gateway, the incoming message in response to the extracted message authentication code not matching the generated message authentication code.

2. The method of claim 1 wherein the another message authentication code is comprised of sixty four or more bits.

3. The method of claim 1 wherein the message is broadcast over the vehicle network in accordance with Controller Area Network message protocol.

4. The method of claim 1 wherein the open format is further defined as one of JavaScript Object Notation or Extensible Markup Language.

5. The method of claim 1 wherein constructing another message further comprises receiving multiple messages broadcast over the vehicle network and appending the multiple messages together to form the another message.

6. The method of claim 5 wherein message authentication codes residing in each of the multiple messages which form the another message is comprised in total of sixty four or more bits.

7. The method of claim 6 wherein the continued processing further includes:
   decrypting the incoming message;
   translating the message identifier and the payload data from the open format to the format defined by the vehicle manufacturer;
   extracting a certification from the decrypted incoming message, where the certification is provided to the external entity by a trusted third party;
   generating a new message authentication code by hashing the translated message identifier, the translated payload data and the certification; and
   broadcasting a new message on the vehicle network, where the new message is comprised of the translated message identifier, the translated payload data, the certification and the new message authentication code.

8. The method of claim 1 wherein continued processing includes:
   decrypting the incoming message;
   translating the message identifier and the payload data from the open format to the format defined by the vehicle manufacturer;
   generating a new message authentication code by hashing the translated message identifier and the translated payload data; and
   broadcasting a new message on the vehicle network, where the new message is of the translated message identifier, the translated payload data and the new message authentication code.

9. A method for exchanging data between a vehicle and an entity external to the vehicle, comprising:
   receiving, at a gateway in the vehicle, an incoming message sent from an entity external to the vehicle, where the incoming message includes a message identifier, payload data, a message authentication code, and a second message authentication code, such that the message identifier identifies a recipient controller in the vehicle and the payload data formatted in accordance with an open format and the message authentication code is generated by the external entity using a sender key shared between the gateway and the external entity and the second message authentication code is generated by the external entity using a content key shared between the recipient controller and the external entity;

extracting, by the gateway, the payload data and the message authentication code from the incoming message;

generating, by the gateway, a message authentication code using the payload data and the sender key which is known to the gateway;

comparing, by the gateway, the extracted message authenticated code to the generated message authentication code;

discarding, by the gateway, the incoming message in response to the extracted message authentication code not matching the generated message authentication code;

processing, by the gateway, the incoming message in response to the extracted message authentication code matching the generated message authentication code, wherein processing the incoming message includes;

decrypting the incoming message using the sender key;

translating the message identifier and the payload data from the open format to a format defined by the vehicle manufacturer;

generating a new message authentication code by hashing the translated message identifier and the translated payload data; and broadcasting a new message on the vehicle network, where the new message includes the translated message identifier, the translated payload data and the new message authentication code and the second message authentication code.

10. The method of claim 9 further comprises:

extracting a certification from the decrypted incoming message, where the certification is provided to the external entity by a trusted third party;

generating the new message authentication code by hashing the translated message identifier, the translated payload data and the certification; and broadcasting the new message on the vehicle network, where the new message is comprised of the translated message identifier, the translated payload data, the certification and the new message authentication code.

11. The method of claim 9 wherein the message authentication code is comprised of sixty four or more bits.

12. The method of claim 9 wherein the message is broadcast over the vehicle network in accordance with Controller Area Network message protocol.

13. The method of claim 9 wherein the open format is further defined as one of JavaScript Object Notation or Extensible Markup Language.

* * * * *